(12) United States Patent
Sima

(10) Patent No.: US 11,380,327 B2
(45) Date of Patent: Jul. 5, 2022

(54) SPEECH COMMUNICATION SYSTEM AND METHOD WITH HUMAN-MACHINE COORDINATION

(71) Applicant: NANJING SILICON INTELLIGENCE TECHNOLOGY CO., LTD., Jiangsu (CN)

(72) Inventor: Huapeng Sima, Nanjing (CN)

(73) Assignee: NANJING SILICON INTELLIGENCE TECHNOLOGY CO., LTD., Jiangsu (CN)

(*) Notice: Subject to any disclaimer, the term of this patent is extended or adjusted under 35 U.S.C. 154(b) by 0 days.

(21) Appl. No.: 17/420,981

(22) PCT Filed: Apr. 2, 2021

(86) PCT No.: PCT/CN2021/085323
§ 371 (c)(1),
(2) Date: Jul. 6, 2021

(87) PCT Pub. No.: WO2021/160191
PCT Pub. Date: Aug. 19, 2021

(65) Prior Publication Data
US 2022/0044679 A1    Feb. 10, 2022

(30) Foreign Application Priority Data

Apr. 28, 2020    (CN) .......................... 202010346872

(51) Int. Cl.
*G10L 15/22*    (2006.01)
*G10L 13/033*    (2013.01)
(Continued)

(52) U.S. Cl.
CPC ............ *G10L 15/22* (2013.01); *G10L 13/033* (2013.01); *G10L 15/26* (2013.01); *G10L 19/032* (2013.01); *H04M 3/5166* (2013.01)

(58) Field of Classification Search
None
See application file for complete search history.

(56) References Cited

U.S. PATENT DOCUMENTS 6,144,938 A * 11/2000 Surace ................ H04M 3/4936
704/E13.004
6,757,362 B1 * 6/2004 Cooper ................ H04M 3/527
379/88.16
(Continued)

FOREIGN PATENT DOCUMENTS

CN    104809197 A    7/2015
CN    105427855 A    3/2016
(Continued)

OTHER PUBLICATIONS

First Office Action (Chinese and English) of Chinese Application No. 202010346872.9, dated Jun. 11, 2020 (27 Pages).

(Continued)

*Primary Examiner* — Neeraj Sharma
(74) *Attorney, Agent, or Firm* — Harness, Dickey & Pierce, P.L.C.

(57) ABSTRACT

The present disclosure relates to a field of intelligent communications, and discloses a speech communication system and method with human-machine coordination, which resolve a problem of bad client experience because great differences occur after a switchover in a call through a prior human-machine coordination and time of a client is wasted. Key points of the technical solutions of the present disclosure include a communications module; an answering and calling-out module, allocating a human agent; a speech intention understanding module for understanding an intention in a call process; a voice cloning module, synthesizing, from a reply text, voice of a corresponding attendant; a human-machine interaction module, to communicate with a client by a speech robot; an intervention prompting module, (Continued)

monitoring call content to obtain an intervention willing probability, and prompting the human agent according to a predefined rule; and a manual intervention module, through which the client is replied by a person, and the manual intervention module displays a call intention and prompts the call during the call. In this way, during the call, a seamless switchover may be performed between the human agent and the speech robot. After the manual intervention, the attendant can quickly understand the call intention, to ensure good call experience of the client.

8 Claims, 1 Drawing Sheet

(51) Int. Cl.
*G10L 15/26* (2006.01)
*G10L 19/032* (2013.01)
*H04M 3/51* (2006.01)

(56) References Cited

U.S. PATENT DOCUMENTS

| | | | | |
|---|---|---|---|---|
| 8,660,849 | B2* | 2/2014 | Gruber | G06N 3/006 |
| | | | | 340/988 |
| 10,171,662 | B1* | 1/2019 | Zhou | G10L 25/63 |
| 2001/0047261 | A1* | 11/2001 | Kassan | G10L 15/32 |
| | | | | 704/E15.047 |
| 2005/0033582 | A1* | 2/2005 | Gadd | G06Q 30/02 |
| | | | | 704/277 |
| 2013/0262126 | A1* | 10/2013 | Schalk | G10L 15/00 |
| | | | | 704/275 |
| 2016/0342317 | A1* | 11/2016 | Lim | G10L 15/22 |
| 2017/0214779 | A1 | 7/2017 | Moran et al. | |
| 2017/0358296 | A1* | 12/2017 | Segalis | G10L 15/222 |
| 2019/0034414 | A1 | 1/2019 | Kim et al. | |
| 2020/0302364 | A1* | 9/2020 | Singh | G06Q 10/06316 |
| 2021/0174150 | A1* | 6/2021 | Ripley | G06V 30/40 |
| 2021/0201327 | A1* | 7/2021 | Konig | G06N 3/08 |
| 2021/0203782 | A1* | 7/2021 | Vymenets, Jr. | G10L 13/033 |

FOREIGN PATENT DOCUMENTS

| | | |
|---|---|---|
| CN | 108184031 A | 6/2018 |
| CN | 108205525 A | 6/2018 |
| CN | 108777751 A | 11/2018 |
| CN | 110035187 A | 7/2019 |
| CN | 110113501 A | 8/2019 |
| CN | 111246027 A | 6/2020 |

OTHER PUBLICATIONS

Second Office Action (Chinese and English) of Chinese Application No. 202010346872.9, dated Sep. 15, 2020 (26 Pages).
Notification to Grant Patent Right for Invention issued in Chinese Application No. 202010346872.9, granted Jan. 14, 2021 (with English Translation).
International Search Report regarding Application No. PCT/CN2021/085323 dated Jun. 23, 2021. English translation provided by Chinable IP.

* cited by examiner

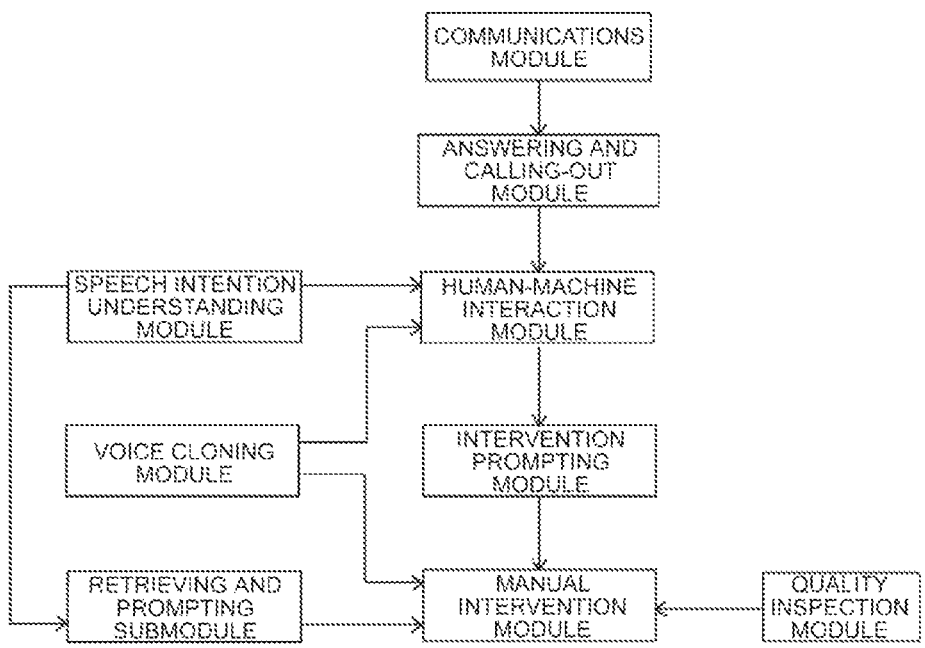

SPEECH COMMUNICATION SYSTEM AND METHOD WITH HUMAN-MACHINE COORDINATION

CROSS-REFERENCE TO RELATED APPLICATIONS

This application is a U.S. National Phase Application under 35 U.S.C. 371 of International Application No. PCT/CN2021/085323, filed on Apr. 2, 2021, which claims priority to the Chinese Application No. 202010346872.9, filed with the China National Intellectual Property Administration on Apr. 28, 2020 and entitled "SPEECH COMMUNICATION SYSTEM AND METHOD WITH HUMAN-MACHINE COORDINATION", the entire disclosures of the above applications are expressly incorporated by reference herein.

FIELD OF THE INVENTION

The present disclosure relates to the field of intelligent communications, and in particular, to a speech communication system and method with human-machine coordination.

BACKGROUND OF THE INVENTION

With rapid development of AI and a communication technology, speech robots have been widely applied to various industries. For example, when there is a need for an enterprise to communicate with potential clients, the speech robot can significantly reduce costs of a manual outgoing call, improve efficiency of the outgoing call, and cover the potential clients more widely. For example, when the client has questions and needs to contact with client service from the enterprise, the speech robot can quickly answer the questions in accordance with a template. In this way, efficiency is high and manual costs are reduced.

However, by purely a speech robot, there is a problem that information transmission efficiency of an outgoing call is not high; or that the speech robot cannot handle the question if the question of the client is complex and is out of the template, so that client requirements cannot be satisfied. Moreover, due to such a perception that the existing speech robot in the market is not intelligent enough, clients are generally averse to communicating with the speech robot. Therefore, it is difficult to work independently purely by the speech robot.

Compared with the speech robot, a purely manual labor has advantages in accumulation of common knowledge and emotion recognition, and can flexibly handle conditions that are more complex; but has a limited workload affordable, an intense emotional fluctuation, and uneven professional levels. For example, for telesales, a true challenge for an attendant of a human agent usually is not from professionality insufficiency, but from frustration when the client refuses and rings off.

Therefore, currently, a manner of human-machine coordination is more favored in the market. In other words, the client is first served by a speech robot, and is switched to a person when the speech robot cannot deal. However, after the human-machine switchover, the attendant needs some time to acquire conversation information between the speech robot and the client. Particularly, the client needs to give time for the attendant to comb call content while facing that information is acquired from the speech robot in low efficiency, resulting in a bad client experience to the client. Thus, the client may be caused to have a feeling of dislike or even disgust. As a result, a problem occurs that it is difficult to reach an objective of the call.

SUMMARY OF THE INVENTION

An objective of the present disclosure is to provide a speech communication system and method with human-machine coordination. In this way, during a call, a seamless switchover between a human agent and a speech robot is achieved, and after a manual intervention, an attendant can quickly understand a call intention, thus ensuring good call experience of a client.

The foregoing technical objective of the present disclosure is achieved through the following technical solutions.

In a first aspect, the present disclosure provides a speech communication system with human-machine coordination, including a communications module, and further including:

an answering and calling-out module, allocating a human agent after a call is connected;

a speech intention understanding module, including a speech intention understanding model for understanding an intention in a call process;

a voice cloning module including a voice cloning model, for synthesizing, from a reply text, voice of a corresponding attendant;

a human-machine interaction module, invoking the speech intention understanding module through a speech robot to obtain an intention of a client and further invokes, according to pre-edited speechcraft, the voice cloning module to communicate with the client by the voice of the corresponding attendant;

an intervention prompting module, including a quantization analysis submodule, monitoring in real-time call content during a human-machine interaction to obtain an intervention willing probability and prompting the human agent according to a predefined rule; and a manual intervention module, replying the client by speech of the corresponding attendant and/or by processing reply content of a random attendant into voice of the corresponding attendant through invoking the voice cloning module, and further including a retrieving and prompting submodule that can invoke the speech intention understanding module, to display a call intention and give the random attendant a prompt for conversation.

In a second aspect, the present disclosure provides a speech communication method with human-machine coordination, including the following steps: after a call is connected, allocating a human agent by an answering and calling-out module;

invoking, by a speech robot in a human-machine interaction module, a speech intention understanding module to obtain an intention of a client, and further invoking, according to pre-edited speechcraft, a voice cloning module to communicate with the client by voice of a corresponding attendant;

monitoring in real-time, by a quantization analysis submodule of an intervention prompting module, call content during a human-machine interaction to obtain an intervention willing probability, and prompting the human agent according to a predefined rule; and when the human agent receives an intervention prompt, intervening in the call by a manual intervention module, displaying, by a retrieving and prompting submodule, an intention during a call process through human-machine interaction, replying the client by speech of the corresponding attendant and/or by processing reply content of a random attendant into voice of the corresponding attendant through invoking the voice cloning module, and giving the random attendant a prompt for conversation during the call process by the retrieving and prompting submodule.

Optionally, the quantization analysis submodule is configured to obtain the intervention willing probability for the current client needing manual intervention based on comparative analyses of big data of historical calls and a current human-machine interaction process.

Optionally, when a random attendant selects to perform manual intervention, the retrieving and prompting submodule directly invokes the speech intention understanding module to display an intention of a call through human-machine interaction; and the retrieving and prompting submodule invokes the speech intention understanding module during a process in which the call is manually intervened, to obtain a newest call intention, and retrieves reference information from a database to generate and display a reply text.

Optionally, manners by which the human agent performs an intervention include:

directly replying the client by speech by the corresponding attendant;

selecting, by a random attendant, a prompting text generated by the retrieving and prompting submodule, the prompting text being generated into speech by the voice cloning module to reply the client;

manually inputting a text by a random attendant, the text being generated into speech by the voice cloning module to reply the client;

speech of a random attendant, being converted into text by a speech recognition submodule in the voice cloning module, and being then generated into speech by the voice cloning module to reply the client.

Optionally, generation and applications of a speech intention understanding model in the speech intention understanding module include the following steps:

training the speech intention understanding model based on deep learning by a lot of speech data with intention annotations;

deploying the trained speech intention understanding model to a speech intention understanding server; and receiving and inputting the speech data into the speech intention understanding server during a conversation to invoke a speech intention understanding service, and returning a recognized intention.

Optionally, generation and applications of the voice cloning model include the following steps:

collecting voice corpus of an attendant corresponding to the human agent, to train an initial voice cloning model;

deploying the trained voice cloning model to a voice cloning server; and synthesizing, from a manually intervened reply text, voice of the corresponding attendant to play to the client.

Optionally, the manual intervention module further includes a quality inspection module for inspecting a speaking speed and content of a random attendant, and feeding back an inspection result to the human agent in real-time.

In a third aspect, the present disclosure further provides a speech communication method with human-machine coordination, which is applicable to the speech communication system according to the first aspect, including:

inputting call content into the speech intention understanding model, to obtain a call intention contained in the call content;

obtaining preset reply content matching the call intention; obtaining a voice feature of a pre-allocated human agent;

inputting the preset reply content and the voice feature into the voice cloning model, to obtain a cloned audio;

answering a call by the cloned audio, where the cloned audio is an audio whose voice feature matches the human agent;

inputting the call content and the call intention into the quantization analysis submodule to calculate a current intervention willing probability, where the current intervention willing probability is a probability in which a prospective client is generated;

invoking the human agent to intervene in the call if the current intervention willing probability is greater than a preset threshold;

obtaining a historical call intention and preset call prompt text by a retrieving and prompting submodule; answering the call by speech based on the historical call intention and the preset call prompt text;

and/or inputting reference reply content into the audio cloning model, to obtain a cloned audio; and answering the call by the cloned audio, where the reference reply content is speech replied by other human agents.

Optionally, the step of inputting the call content and the call intention into a quantization analysis submodule to calculate a current intervention willing probability includes:

obtaining content of each query session contained in the call content, where the query session is a process in which both parties of the call inquire;

performing a traversal operation to each query session regarded as a branch; and when a predefined key branch that matches the traversed branch exists in a preset intervention willing probability database, obtaining an intervention willing probability from the predefined key branch, to serve as a current intervention willing probability from the current call.

Optionally, the step of inputting the call content and the call intention into a quantization analysis submodule to calculate a current intervention willing probability further includes:

obtaining content of each question-and-answer session contained in the call content, where the question-and-answer session is a process in which both parties of the call inquire and reply;

traversing an intervention willing probability database; and when a preset keyword that matches the question-and-answer session exists in the intervention willing probability database, obtaining an intervention willing probability from the preset keyword, to serve as a current intervention willing probability from the current call.

Optionally, the step of inputting the call content and the call intention into a quantization analysis submodule to calculate a current intervention willing probability further includes:

obtaining the call intention;

traversing an intervention willing probability database; and when a predefined intention that matches the call intention exists in the intervention willing probability database, obtaining an intervention willing probability from the predefined intention, to serve as a current intervention willing probability from the current call.

Optionally, the step of inputting the call content and the call intention into a quantization analysis submodule to calculate a current intervention willing probability further includes:

obtaining preset reply content matching the call intention;

traversing an intervention willing probability database; and when a predefined willing-determining rule that matches the preset reply content exists in the intervention willing probability database, obtaining an intervention willing probability corresponding to the predefined willing-determining rule, to serve as a current intervention willing probability from the current call.

Optionally, the method further includes:

setting a predefined key branch, a preset keyword, a predefined intention, and a predefined willing-determining rule; and storing the predefined key branch, the preset keyword, the predefined intention, and the predefined willing-determining rule into a preset database, to form an intervention willing probability database.

Optionally, after the step of storing the predefined key branch, the preset keyword, the predefined intention, and the predefined willing-determining rule into a preset database, the method further includes:

obtaining historical call data, where the historical call data is call content of both parties of the call;

screening out calls in which the human agent intervenes from the historical call data; and screening out a call, in the manually intervened calls, that has the predefined key branch, the preset keyword, the predefined intention, and the predefined willing-determining rule, to serve as a high willing probability call.

Optionally, after the step of the screening out a call, in the manually intervened calls, that has the predefined key branch, the preset keyword, and the predefined intention, to serve as a high willing probability call, the method further includes:

counting a quantity of the manually intervened calls, and a quantity of the high willing probability calls; and calculating a ratio between the quantity of the high willing probability calls and the quantity of the manually intervened calls, to obtain an intervention willing probability from the predefined key branch, the preset keyword, the predefined intention, and the predefined willing-determining rule.

In view of the above, according to the present disclosure, the human agent may be intelligently prompted by the intervention prompting module, and the attendant is prompted at most proper time to intervene in, avoiding a bad client call caused by that the speech robot cannot well reply the client and a person does not perform an intervention in time.

The present disclosure is not intended to recognize text through the conversional ASR and then recognize an intention by NLP, but to directly recognize a user intention from speech by the speech intention understanding model, being obviously superior to a conventional method in effects, efficiency, and costs.

During a call, through the manual intervention module, the call intention before an intervention is displayed by the retrieving and prompting submodule, and the attendant is not required to understand all the call content but directly learns the client intention. In this way, time for understanding is stored, and call experience of the client is not affected by a human-machine switchover. During the call process, the client intention is intelligently recognized, and the corresponding reply content is retrieved to prompt the attendant. Thus, the attendant responds a relevant question more quickly, thereby improving service efficiency and ensuring call experience of the client.

The voice that is of the attendant corresponding to the human agent and is generated by the voice cloning module makes the client feel that he or she is communicating with an attendant of the human agent all the time, achieving a seamless switchover between a person and the speech robot. In this way, better call feelings can be provided for the client.

Manners of manual intervention are not limited to replying by speech by a particular attendant, and the client may be served by multiple people and different people. In this way, better call experience can be provided for the client.

BRIEF DESCRIPTION OF THE DRAWINGS

To describe the technical solutions of the present disclosure to be more clear, the accompanying drawings to be used for the embodiments are briefly described below. Obviously, persons of ordinary skills in the art can also derive other accompanying drawings according to these accompanying drawings without an effective effort.

FIG. 1 is a block diagram of a system according to an embodiment of the present disclosure.

DETAILED DESCRIPTION OF THE EMBODIMENTS

The present disclosure is described in detail below with reference to the accompanying drawings and the specific embodiments. Obviously, the described embodiments are merely some and not all of embodiments in accordance with the present disclosure. According to the embodiments of the present disclosure, all other embodiments derived by persons of ordinary skills in the art without an effective effort fall within the protection scope of the present disclosure.

As shown in FIG. 1, the present disclosure provides a speech communication system with human-machine coordination, including a communications module; an answering and calling-out module, allocating a human agent after a call is connected;

a speech intention understanding module including a speech intention understanding model, for understanding an intention in a call process;

a voice cloning module including a voice cloning model, for synthesizing a reply text into voice of a corresponding attendant;

a human-machine interaction module, where a speech robot invokes the speech intention understanding module to obtain an intention of a client and further invokes, according to pre-edited speechcraft, the voice cloning module to communicate with the client by the voice of the corresponding attendant;

an intervention prompting module including a quantization analysis submodule, for monitoring in real-time call content during a human-machine interaction to obtain an intervention willing probability, and prompt the human agent according to a predefined rule; and a manual intervention module, replying the client by speech of the corresponding attendant and/or by processing reply content of a random attendant into voice of the corresponding attendant through invoking the voice cloning module, and further including a retrieving and prompting submodule that can invoke the speech intention understanding module, to display a call intention and give the random attendant a prompt for conversation.

Correspondingly, the present disclosure further provides a speech communication method with human-machine coordination, including the following steps: after a call is connected, allocating a human agent by an answering and calling-out module;

invoking, by a speech robot in a human-machine interaction module, a speech intention understanding module to obtain an intention of a client, and further invoking, according to pre-edited speechcraft, a voice cloning module to communicate with the client by voice of a corresponding attendant;

monitoring in real-time, by a quantization analysis submodule of an intervention prompting module, call content during a human-machine interaction to obtain an intervention willing probability, and prompting the human agent according to a predefined rule; and when the human agent receives an intervention prompt, intervening in the call by a manual intervention module, displaying, by a retrieving and prompting submodule, an intention during a call process through human-machine interaction, replying the client by speech of the corresponding attendant and/or by processing reply content of a random attendant into voice of the corresponding attendant through invoking the voice cloning module, and giving the random attendant a prompt for conversation during the call process by the retrieving and prompting submodule.

The communications module implements basic communication functions, and provides bottom supports for outgoing calls, connection, and three-way calling.

The answering and calling-out module calls the client according to an imported number or answers a call from the client, and allocates a human agent for each answering task and calling task after the call is connected, to ensure that every call is served by a corresponding human agent.

The speech intention understanding module includes a speech intention understanding model. Most conventional speech intention understanding modules first obtain text through a speech recognition technology and then recognize an intention. However, accuracy of intention recognition based on text greatly relies on accuracy of the speech recognition technology. However, the speech intention understanding model in the present disclosure adopts the speech intention understanding technology that is based on deep learning, and directly recognizes a corresponding intention from inputted speech data by a deep neural network, achieving such effects that information losses caused by speech recognition are reduced and accuracy of speech intention recognition is improved.

Generation and applications of the speech intention understanding model include the following steps:

training the speech intention understanding model based on deep learning by a lot of speech data with intention annotations. Specifically: (1) first, a sound sequence data input is received, and phonetic features such as MFCC (Mel-scaleFrequency Cepstral Coefficients)are extracted; subsequently, a transformer neural network is used to extract phoneme and grapheme features by taking these phonetic feature data as inputs; and then these phoneme and grapheme features are inputted to an input layer of the neural network, to tune parameters of the neural network to form a pre-training model; (2) on the basis of a pre-training model, the speech intention understanding model is trained based on the speech data with an intention annotated. First, speech data containing user intentions is collected. Subsequently, categories of the user intentions contained in the speech data are annotated, to obtain user speech with an intention annotation. Then the user speech with an intention annotation is converted into phonemes and graphemes with speech intention features. Finally, the pre-training model is loaded, to input the phonemes and graphemes that are obtained in the previous step to the input layer of the neural network, to train the speech intention understanding model.

deploying the trained speech intention understanding model to a speech intention understanding server; and receiving and inputting the speech data into the speech intention understanding server during a conversation to invoke a speech intention understanding service, and a recognized intention is returned. Specifically, to-be-recognized speech is inputted; noise reduction and feature extraction are performed to the inputted speech, to convert the to-be-recognized speech into a feature vector containing voice information; the feature vector is inputted to the trained speech intention understanding model to be recognized; and recognized speech intention is outputted.

The voice cloning module includes a voice cloning model and a speech recognition submodule. Generation and applications of the voice cloning model include the following steps: collecting voice corpus of an attendant corresponding to the human agent, to train an initial voice cloning model; deploying the trained voice cloning model to a voice cloning server; and synthesizing speech from a reply intervened by the human agent as voice of the corresponding attendant to play to the client.

The voice cloning model is specifically obtained according to the following steps.

(1) The voice corpus of the attendant corresponding to the human agent is collected. A corpus collection module collects speech and corpus data for training the voice cloning model. The data is mainly true speech of the attendant. Therefore, voice of the trained voice cloning model is relatively highly similar to that of the corresponding attendant, thus a seamless switchover between the speech robot and the human agent may be achieved.

The corpus comes from: speechcraft recording in a speechcraft market, speech and audio corpus answered by the attendant in the call process, and corpus that are specially manually collected for a cloning model (for example, a recording read in a recording studio according to a dedicated manuscript).

The collected corpus requires a corpus self-test first, to eliminate corpus with relatively large deviations, obvious background sound, and great deviations in timbre. Subsequently, a process of automatic noise reduction and enhancement is performed to the corpus.

(2) A model is trained. On the basis of the foregoing voice corpus of the attendant, the voice cloning model dedicated to the human agent is trained.

A voice cloning model matching the corresponding attendant needs to be trained for every human agent, so as to reduce differences between voice of the speech robot and voice of the attendant of the human agent as possible when a person intervenes. In addition, because of upgrade and optimization of an underlying model, an online model also needs to support for repeated training.

A training process of the voice cloning model is as follows.

First, a self test and noise reduction are performed to the collected voice corpus. The collected corpus generally has corresponding text, but usually there are cases in which several words of the text are not accurately corresponding to those of an audio. Therefore, correspondence between the audio and the text needs to be checked manually, to ensure accurate correspondence between pronunciation and the text, including modal particles and the like that are additionally added by a speaker while reading. Subsequently, the text in the corpus is performed with normalization processing, to convert digits, dates, decimal number, unit symbols, and the like into Chinese characters; and segmentation and part-of-speech tagging are performed to the text by natural language processing (NLP) technology, to recognize a name and an organization name, and disambiguate heteronyms in Chinese. Further, a prosodic boundary, accent, a pause, a modified tone, and other features of a sentence are manually annotated. Subsequently, the text is converted into Pinyin and phonemes and is unitedly coded. Word/term embedding is performed by an NLP model (such as BERT), to convert all words or terms in the sentence into a vector form. Spectral features of audio data are extracted. A word embedded vector and a spectral feature of an audio are both inputted into the voice cloning model, and a back propagation algorithm is operated to perform iterative optimization until the model is converged.

The foregoing process of synthesizing speech by the voice cloning model is as follows.

(1) Online deployment. The voice cloning model that is trained and tuned is deployed to the voice cloning server.

(2) Speech synthesizing. When the speech robot provides services or a person intervenes to provide services, the voice cloning model corresponding to the human agent is invoked based on designated text to synthesize speech in real time to display to the client.

Steps of speech synthesizing are as follows.

First, inputted text for speech synthesis is analyzed; digits, dates, decimal number, unit symbols, and the like are converted into Chinese characters according to a text normalization rule; and segmentation and part-of-speech tagging are performed to the text by the natural language processing (NLP) technology, to recognize a name and an organization name, and disambiguate heteronyms in Chinese. Further, a prosodic boundary, accent, a pause, a modified tone, emotion, and other features of a sentence that affect pronunciation are predicted. Subsequently, the text is converted into Pinyin and phonemes and is unitedly coded. Word/term embedding is performed by the NLP model (such as BERT), to convert all words or terms in the sentence into a vector form. An embedded vector is inputted into the trained voice cloning model and a forward propagation algorithm is operated, to output an acoustic feature. Further, the acoustic feature is converted into a speech waveform by a voice coder (a vocoder, such as a wavenet, a wavernn, or another network), so as to obtain corresponding speech.

The human-machine interaction module realizes that a basic speech robot for AI conversations, that is, the speech robot communicate with the client by speech based on pre-edited speechcraft. Moreover, the speech robot uses the speech intention understanding model in the speech intention understanding module that is based on deep learning to understand the intention of the client. Audio used by the speech robot for conversation with the client is synthesized by the voice cloning model that matches the voice of the attendant corresponding to the human agent. Moreover, after current number is connected, call content between the speech robot and the client may further be synchronously transmitted to the current human agent to be viewed when a person intervenes.

On the basis of the predefined rule and dynamic information of the conversation, the intervention prompting module can intelligently give a prompt that the human agent intervenes. The human agent decides based on the prompt whether to intervene manually.

The quantization analysis submodule is included, and is configured to obtain the intervention willing probability for the current client needing manual intervention based on comparative analyses of big data of historical calls and a current human-machine interaction process. The quantization analysis submodule may analyze all flow nodes based on big data of historical conversions. A probability in which a prospective client may be generated after the manual intervention is referred to as "intervention willing probability".

Moreover, the predefined rule is to set a threshold, for example, 50%, for the intervention willing probability. During a conversation between the speech robot and the client, if it is found that a matching intervention willing probability is greater than the threshold, the human agent is prompted that a prospective client is more likely to be generated if intervening in at this time.

When the intervention prompting module searches a matching intervention willing probability, one or more of the following rules are sued.

(1) The conversation enters a predefined key branch.
(2) What said by the client triggers a particular keyword.
(3) A particular intention of the client is recognized.
(4) It is determined that the client is a particular prospective client.

For example, in a scenario of loaning, during a conversation between the speech robot and a client, if the client says "How much can I loan at most? What are the requirements for a loan", a flow node of "loan limit answering" is entered, and meanwhile, a keyword of "what requirements" is triggered. Through querying statistical data, it is found that an intervention willing probability when a keyword of "what requirements" is triggered at a node of "asking for a loan limit" is 75%, being greater than the foregoing threshold (50%),In this case, the human agent may be prompted that "the intervention willing probability is 75%". The human agent may intervene in manually by clicking the prompt. Here, the rule (1) and the rule (2) are used at the same time.

For another example, during a conversion between the speech robot and the client, an intention recognized by the speech intention understanding model is "asking for a contact method". Moreover, if the intervention willing probability is 71% (greater than 50%) when the intention is "asking for a contact method", the human agent is prompted that the "intervention willing probability is 71%". Here, the rule (3) is used.

For another example, during a conversion between the speech robot and the client, according to a predefined intention determining rule in the speechcraft, if it is determined that the intention of the client is B, and an intervention willing probability for B-class clients is 69% (greater than 50%), the human agent is prompted that the "intervention willing probability is 69%". Here, the rule (4) is used.

According to an intervention prompt, the manual intervention module selects to intervene in a human-machine interaction, to achieve three-way calling among the human agent, the speech robot, and the client. Intervention of the human agent may provide more complex and flexible services for the client. When manual intervention is performed, the speech robot stops an automatic speech interaction, and a subsequent call process with the client is controlled by the attendant.

Intervening manners for the human agent include:

directly replying the client by speech by the corresponding attendant;

selecting, by a random attendant, a prompting text generated by the retrieving and prompting submodule, the prompting text being generated into speech by the voice cloning module to reply the client;

manually inputting a text by a random attendant, the text being generated into speech by the voice cloning module to reply the client; and speech of a random attendant, being converted into text by a speech recognition submodule in the voice cloning module, and being then generated into speech by the voice cloning module to reply the client.

Specifically, when a random attendant selects to perform manual intervention, the retrieving and prompting submodule directly invokes the speech intention understanding module to display an intention of a call through human-machine interaction; and the retrieving and prompting submodule invokes the speech intention understanding module during a process in which the call is manually intervened, to obtain a newest call intention, and retrieves reference information from a database to generate and display a reply text.

Regarding dynamic information during the conversation, the retrieving and prompting submodule retrieves relevant data in real-time, gives a prompt or a suggestion on replies for an agent, and retrieves relevant information from a database based on the preset keyword triggered during the conversion and in combination with a user intention recognized by the speech intention understanding model, such as frequently asked questions, data concerned by the user; or regarding what said by the client, searches a proper suggestion on replies in the database. The foregoing retrieved data is displayed on a screen of the human agent in real time to be referred or directly selected to be used when the attendant intervenes in, thus greatly improving a response speed of the human agent.

For example, in a scenario of loaning, during a conversation between the speech robot or the human agent and a client, if the client says "How much can I loan at most? What are the requirements for a loan", an intention recognized by the speech intention understanding model is "asking for a loan limit", and keywords "how much to loan" and "what requirements" are triggered at the same time. According to these conditions and a predefined rule in the speechcraft, lending rate, a loan limit, and other information are searched for from a loan business database by further searching an API interface, and a prompting sentence that "the lending rate is 5%, a limit for a personal loan is at least 10 thousands RMB, and an institution needs to be informed 1-3 days in advance of the loan" is dynamically constructed and is displayed to the human agent, for reference when manual intervention is required. In combination with the prompting information, experience and reply sentences that are historically summarized can be further searched for from a library about frequently asked questions (FAQ), to inform, after the human agent intervenes in, the attendant how to reply the client and how to guide an intention of the client, and to give guidance suggestions for the client, to ensure that an order is finally achieved.

Specifically, the manual intervention module further includes a quality inspection module for inspecting a speaking speed and content of a random attendant, and feeding back an inspection result to the human agent in real-time.

During a conversion, the quality inspection module can remind the attendant in real-time, to optimize call experience of the client.

A method for content inspection is matching a library of sensitive words based on a segmentation result. A matching method is statistically analyzing a matching result by a normalization expression and a library of predefined rules.

An inspection method for the speaking speed is: first recognizing speech to text by the speech recognition technology, and then calculating the speaking speed based on duration of the speech and word count; and comparing a current speaking speed that is calculated with a historical average speaking speed. If the current speaking speed is significantly higher than the historical average speaking speed, it is considered that the speaking speed is too fast.

For example, if the attendant is in a bad mood while speaking or says something that exceeds a service scope, a warning is given, to ensure client experience.

For example, when the human agent intervenes in, if the attendant is emotional and swears the client, the quality inspection module matches sensitive words of dirty words according to a built-in library of sensitive words, indicating that the agent is ill-mannered. The module pushes this record to a supervisor, and the supervisor may criticize, educate, and warn the agent. For another example, when the human agent intervenes in, the quality inspection module matches a built-in library of polite languages by a last sentence said by the agent before the conversation ends. In this way, it may be inspected whether the attendant uses polite languages such as "goodbye", "thanks", and the like to end the conversation, thus helping to improve an attitude in services.

The present disclosure further provides a speech communication method with human-machine coordination, which is applicable to the speech communication system in the foregoing embodiments. Specifically, the following steps are included.

S1: Input call content into the speech intention understanding model, to obtain a call intention contained in the call content.

In this embodiment, the speech intention understanding model can recognize the call intention contained in the call content directly based on the call content. For example, when a caller asks what the phone number is, the speech intention understanding model recognizes that a call intention of the caller is "asking for a contact method". A method of recognizing the call content based on the speech intention understanding model has high accuracy.

S2: Obtain preset reply content matching the call intention; and obtain a voice feature of a pre-allocated human agent.

In the technical solutions provided in the present disclosure, after a call is connected, a human agent is first allocated for the call, where one human agent corresponds to one human attendant, and one human attendant may correspond to a plurality of human agents. After the call is connected, the human attendant may monitor a conversation between the caller and the speech robot.

S3: Input the preset reply content and the voice feature into the voice cloning model, to obtain a cloned audio.

In the technical solutions provided in the present disclosure, after the preset reply content is obtained, text of the preset reply content needs to be converted into speech for reply to the client. Moreover, the speech for reply needs to match the voice feature of the allocated human agent. If the call is subsequently intervened in by the human agent, the step of generating the cloned audio may reduce differences between a pre-intervention call and a postintervention call, thus improving call quality.

Specifically, the step of generating the cloned audio may include:

S3001: inputting the preset reply content as text for speech synthesis, and preprocess the text for speech synthesis by the text normalization rule and the natural language processing technology.

S3002: Predict a pronunciation feature of the text for speech synthesis, and based on the predicted pronunciation feature, convert the text for speech synthesis into Pinyin and phonemes and unitedly code it.

S3003: Perform vector conversion to the unitedly coded text for speech synthesis by a NLP model.

S3004: Input the text for speech synthesis performed with the vector conversion to the voice cloning model, and operate a forward propagation algorithm to obtain an acoustic feature of the text for speech synthesis.

S3005: Convert the acoustic feature into a speech waveform by a voice coder, to obtain the cloned audio.

In the technical solutions provided in the present disclosure, training the voice cloning model may be further included, and specifically the following steps are included.

S3006: Collect voice corpus of the human agent, and extract a spectral feature in the voice corpus.

S3007: Check the voice corpus and corresponding literal text.

S3008: Preprocess the checked literal text by the text normalization rule and the natural language processing technology.

S3009: Annotate a pronunciation feature of the preprocessed literal text, and convert, based on an annotation, the voice corpus into Pinyin and phonemes and unitedly code it.

S3010: Perform vector conversion to the unitedly coded literal text by the NLP model.

S3011: Input the spectral feature and the literal text after the vector conversion into the voice cloning model, and operate the back propagation algorithm to perform iterative optimization until the voice cloning model is converged, to obtain the trained voice cloning model.

In this embodiment, noise reduction may be further performed to the voice corpus, to improve accuracy.

S4: Answer a call by the cloned audio, where the cloned audio is an audio whose voice feature matches the human agent.

S5: Input the call content and the call intention into the quantization analysis submodule to calculate a current intervention willing probability, where the current intervention willing probability is a probability in which a prospective client occurs.

In actual applications, the call content and the call intention contained thereby can reflect whether the caller may become a prospective client. In this case, the human agent may intervene in the call, to further communicate with the caller. The intervention willing probability is a probability in which a prospective client may occur upon the current call.

Specifically, the step of inputting the call content and the call intention into the quantization analysis submodule, to calculate the current intervention willing probability includes:

S5001: Obtain content of each query session contained in the call content, where the query session is a process in which both parties of the call inquire.

S5002: Perform a traversal operation to each query session regarded as a branch.

S5003: When a predefined key branch that matches the traversed branch exists in a preset intervention willing probability database, obtain an intervention willing probability from the predefined key branch, to serve as a current intervention willing probability from the current call.

In this embodiment, an example of the query session is as follows. The speech robot inquires whether is willing to buy a house at region A. If the predefined key branch includes "inquiry about house-buying willing", it is indicated that the conversation enter a key branch. In this case, the intervention willing probability from the predefined key branch serves as the current intervention willing probability. In actual applications, the preset key branch may be set in advance according to actual conditions; this is not specifically defined in the present disclosure.

The step of inputting the call content and the call intention into the quantization analysis submodule, to calculate the current intervention willing probability further includes:

S5004: Obtain content of each question-and-answer session contained in the call content, where the question-and-answer session is a process in which both parties of the call inquire and reply.

S5005: Traverse the intervention willing probability database.

S5006: When a preset keyword that matches the question-and-answer session exists in the intervention willing probability database, obtain an intervention willing probability from the preset keyword, to serve as a current intervention willing probability from the current call.

In this embodiment, the preset keyword may be "want to buy a house", "qualification for buying a house", or the like. This may be designed according to actual conditions. An example of the question-and-answer session is as follows. The speech robot asks whether to be willing to buy a house at region A. At this time, answers of the caller may include the following cases: (1) a positive answer: I want to buy a house at region A; (2) a rhetorical question: whether I'm qualified to buy a house; and (3) a negative answer: I do not want to buy a house. In the foregoing replying manners, the preset key branch is entered, and the positive answer and the rhetorical question trigger the preset keyword. Correspondingly, although the negative answer does not trigger the preset keyword, the call also enters the preset key branch.

The step of inputting the call content and the call intention into the quantization analysis submodule, to calculate the current intervention willing probability further includes:

S5007: Obtain the call intention.

S5008: Traverse the intervention willing probability database.

S5009: When a predefined intention that matches the call intention exists in the intervention willing probability database, obtain an intervention willing probability from the predefined intention, to serve as a current intervention willing probability from the current call.

In actual applications, according to step of traversing to obtain the predefined intention matching the call intention, a particular intention of the caller can be recognized.

In some embodiments of the present disclosure, the step of inputting the call content and the call intention into the quantization analysis submodule, to calculate the current intervention willing probability further includes:

S5010: Obtain preset reply content matching the call intention.

S5011: Traverse the intervention willing probability database.

S5012: When a predefined willing-determining rule that matches the preset reply content exists in the intervention willing probability database, obtain an intervention willing probability corresponding to the predefined willing-determining rule, to serve as a current intervention willing probability from the current call.

In this embodiment, the preset reply content can indicate which category of prospective clients the caller is in. Therefore, a willing category of the caller may be made clear by setting the predefined willing-determining rule.

In actual applications, a current willing probability from the current call may be decided by the forgoing steps together. For example, a sum of the current intervention willing probabilities that are calculated in the forgoing steps is a final intervention willing probability. A specific calculation manner may be designed according to actual conditions.

In some embodiments of the present disclosure, the method further includes the following steps.

S5013: Set a predefined key branch, a preset keyword, a predefined intention, and a predefined willing-determining rule.

S5014: Store the predefined key branch, the preset keyword, the predefined intention, and the predefined willing-determining rule into a preset database, to form an intervention willing probability database.

After the step of storing the predefined key branch, the preset keyword, the predefined intention, and the predefined willing-determining rule into the preset database, the following steps are further included.

S5015: Obtain historical call data, where the historical call data is call content of both parties of the call.

S5016: Screen out calls in which the human agent intervenes from the historical call data.

S5017: Screen out a call, in the manually intervened calls, that has the predefined key branch, the preset keyword, the predefined intention, and the predefined willing-determining rule, to serve as a high willing probability call.

In actual applications, the high willing probability call may be a call including a high willing probability event. The high willing probability event may be an event that triggers the predefined key branch, the preset keyword, the predefined intention, and the predefined willing-determining rule, which may be designed according to actual conditions.

After the step of screening out a call, in the manually intervened calls, that has the predefined key branch, the preset keyword, the predefined intention, and the predefined willing-determining rule, to serve as the high willing probability call, the following are further included.

S5018: Count a quantity of the manually intervened calls, and a quantity of the high willing probability calls.

S5019: Calculate a ratio between the quantity of the high willing probability calls and the quantity of the manually intervened calls, to obtain an intervention willing probability from the predefined key branch, the preset keyword, the predefined intention, and the predefined willing-determining rule.

In the technical solutions of the present disclosure, an example of calculating the intervention willing probability is as follows: a counted call quantity is 100, including 10 calls in which the human agent intervenes. In the calls in which the human agent intervenes, if five high willing probability events that trigger a preset keyword are included, a client willing probability corresponding to the preset keyword is 5/10=50%.

S6: Invoke the human agent to intervene in the call if the current intervention willing probability is greater than a preset threshold.

In actual applications, the preset threshold may be 50%; this may be designed according to actual conditions.

S7: Obtain a historical call intention and preset call prompt text by a retrieving and prompting submodule; answer the call by speech based on the historical call intention and the preset call prompt text;

and/or input reference reply content into the audio cloning model, to obtain a cloned audio; and answer the call by the cloned audio, where the reference reply content is speech replied by other human agents.

In this embodiment, after the human agent intervenes in the call, a manual attendant of the human agent may answer the caller by speech based on the historical call intention and the preset call prompt text.

It may be learned from the foregoing technical solutions that the speech communication system and method with human-machine coordination provided in the present disclosure can accurately learn the call intention based on the call content of the caller, match the preset reply content based on the call intention, and generate the cloned audio by the voice cloning module to answer the call. The intervention willing probability may be further calculated, to make sure that the human agent successfully intervenes in the call. Meanwhile, the call is greatly flexibly answered, and the call is highly smooth.

The foregoing embodiments are merely intended for describing the technical solutions of the present disclosure, but not for limiting the present disclosure. Although the present disclosure is described in detail with reference to the preferable embodiments, persons of ordinary skill in the art should understand that modifications or equivalent replacements may be made to the technical solutions of the present disclosure, without departing from the purpose and scope of the technical solutions of the present disclosure, and the modifications and the equivalent replacements shall all fall within the scope of the claims of the present disclosure. Technologies, shapes, and constructions of the present disclosure that are not described in detail are all common general knowledge.

What is claimed is:

1. A speech communication system with human-machine coordination, comprising a communications module, and further comprising:
    an answering and calling-out module, allocating a human agent after a call is connected;
    a speech intention understanding module, comprising a speech intention understanding model, for understanding an intention in a call process;
    a voice cloning module, comprising a voice cloning model, for synthesizing voice of a corresponding attendant from a reply text;
    a human-machine interaction module, invoking the speech intention understanding module through a speech robot to obtain an intention of a client and further invoking, according to a pre-edited speechcraft, the voice cloning module to communicate with the client by the voice of the corresponding attendant;
    an intervention prompting module, comprising a quantization analysis submodule, monitoring in real-time call content during a human-machine interaction to obtain an intervention willing probability and prompting the human agent according to a predefined rule, wherein the intervention willing probability is a probability in which a prospective client is generated; if the intervention willing probability is greater than a preset threshold, the human agent will be invoked to intervene in the call; and
    a manual intervention module, replying the client by speech of the corresponding attendant and/or by processing reply content of a random attendant into voice of the corresponding attendant through invoking the voice cloning module, and further comprising a retrieving and prompting submodule that can invoke the speech intention understanding module, to display a call intention and give the random attendant a prompt for conversation.

2. The speech communication system with human-machine coordination according to claim 1, wherein the manual intervention module further comprises a quality inspection module for inspecting a speaking speed and content of a random attendant, and feeding back an inspection result to the human agent in real-time.

3. A speech communication method with human-machine coordination, comprising steps of: allocating, by an answering and calling-out module, a human agent after a call is connected;
- invoking a speech intention understanding module, through a speech robot of a human-machine interaction module, to obtain an intention of a client and further invoking, according to a pre-edited speechcraft, a voice cloning module to communicate with the client by a voice of an attendant corresponding to the allocated human agent;
- monitoring in real-time, by a quantization analysis submodule of an intervention prompting module, call content during a human-machine interaction to obtain an intervention willing probability and prompting the human agent according to a predefined rule, wherein the intervention willing probability is a probability in which a prospective client is generated; if the intervention willing probability is greater than a preset threshold, the human agent will be invoked to intervene in the call; and
- when the human agent receives an intervention prompt, through a manual intervention module, intervening in the call, displaying by a retrieving and prompting submodule an intention during a call process through human-machine interaction, replying the client by speech of the corresponding attendant and/or by processing reply content of a random attendant into voice of the corresponding attendant through invoking the voice cloning module, and giving the attendant a prompt for conversation during the call process by the retrieving and prompting submodule.

4. The speech communication method with human-machine coordination according to claim 3, wherein the quantization analysis submodule is configured to obtain the intervention willing probability for a current client needing manual intervention based on comparative analyses of big data of historical calls and a current human-machine interaction process.

5. The speech communication method with human-machine coordination according to claim 3, wherein the random attendant selects to perform manual intervention, the retrieving and prompting submodule directly invokes the speech intention understanding module to display the intention of the call through human-machine interaction; and the retrieving and prompting submodule invokes the speech intention understanding module during a process in which the call is manually intervened, to obtain a newest call intention, and retrieves reference information from a database to generate and display a reply text.

6. The speech communication method with human-machine coordination according to claim 3, wherein manners by which the human agent performs an intervention include:
- directly replying the client by speech by the corresponding attendant;
- selecting, by a random attendant, prompting text generated by the retrieving and prompting submodule, which is generated into speech by the voice cloning module to reply the client;
- manually inputting a text by a random attendant, which is generated into speech by the voice cloning module to reply the client;
- speech of a random attendant, which is converted into text by a speech recognition submodule in the voice cloning module, and is then generated into speech by the voice cloning 10 module to reply the client.

7. The speech communication method with human-machine coordination according to claim 3, wherein generation and applications of a speech intention understanding model in the speech intention understanding module include steps of:
- S1. training the speech intention understanding model based on deep learning by using speech data with intention annotations;
- S2. deploying the trained speech intention understanding model to a speech intention understanding server; and
- S3. receiving the speech data during a conversation and inputting the speech data into the speech intention understanding server to invoke a speech intention understanding service, and returning a recognized intention.

8. The speech communication method with human-machine coordination according to claim 3, wherein generation and applications of a voice cloning model include steps of:
- A1. collecting voice corpus of an attendant corresponding to the human agent, to train an initial voice cloning model;
- A2. deploying the trained voice cloning model to a voice cloning server; and
- A3. synthesizing, from a manually intervened reply text, voice of the corresponding attendant to play to the client.

* * * * *